US008630327B2

(12) United States Patent
Couderc et al.

(10) Patent No.: US 8,630,327 B2
(45) Date of Patent: Jan. 14, 2014

(54) SYSTEM FOR EMITTING A POLYCHROMATIC LIGHT, PROVIDED WITH COUPLED SUB-CAVITIES

(75) Inventors: Vincent Couderc, Verneuil (FR); Philippe Paul Leproux, Saint Pardoux (FR); Florent Doutre, Limoges (FR); Dominique Pagnoux, Limoges (FR)

(73) Assignees: Centre National de la Recherche Scientifique-CNRS, Paris (FR); Compagnie Industrielle des Lasers Cilas (CILAS), Orleans (FR)

( * ) Notice: Subject to any disclaimer, the term of this patent is extended or adjusted under 35 U.S.C. 154(b) by 0 days.

(21) Appl. No.: 13/378,467

(22) PCT Filed: Jun. 17, 2010

(86) PCT No.: PCT/FR2010/051215
§ 371 (c)(1),
(2), (4) Date: Mar. 2, 2012

(87) PCT Pub. No.: WO2010/146315
PCT Pub. Date: Dec. 23, 2010

(65) Prior Publication Data
US 2012/0177070 A1    Jul. 12, 2012

(30) Foreign Application Priority Data
Jun. 19, 2009   (FR) ..................... 09 02986

(51) Int. Cl.
H01S 3/082    (2006.01)
(52) U.S. Cl.
USPC ............................ 372/97; 372/25

(58) Field of Classification Search
USPC ..................................... 372/97, 25
See application file for complete search history.

(56) References Cited

U.S. PATENT DOCUMENTS

| 5,854,802 | A  | * | 12/1998 | Jin et al. ........................ 372/22 |
| 7,768,691 | B2 | * | 8/2010  | Nerin et al. .................. 359/326 |
| 2009/0129413 | A1 | * | 5/2009 | Richter ........................ 372/10 |

FOREIGN PATENT DOCUMENTS

JP            05-145149       *   6/1993

OTHER PUBLICATIONS

S.V. Chernikov et al.; "Supercontinuum Self-Q-Switched Ytterbium Fiber Laser"; Optics Letters, OSA, Optical Society of America, Washington, DC, USA; vol. 22, No. 5, Mar. 1, 1997; pp. 298-300; XP000684677; ISSN: 0146-9592.
Bahram Jalali et al.; "Optical Continuum Generation on a Silicon Chip"; Proceedings of the SPIE—The International Society for Optical Engineering SPIE—Int. Society Optical Engineering USA; vol. 5931; No. 1; 2005; pp. 59310Q-1; XP040209092; ISSN: 0277-786X.

(Continued)

Primary Examiner — Tod T Van Roy
(74) Attorney, Agent, or Firm — Bachman & LaPointe, P.C.

(57) ABSTRACT

A system for emitting a polychromatic light, has a laser cavity device used to optically pump the laser cavity emit radiation according to at least one excitation wavelength and light guiding mechanism arranged in such a way as to supply a polychromatic light to an outlet in the event of excitation by the radiation in a non-linear interaction regime. In the system, the guiding mechanism is arranged inside a cavity formed by at least two sub-cavities, a first sub-cavity forming the laser cavity and a second sub-cavity comprising the guiding mechanism, the first and second sub-cavities being coupled.

8 Claims, 1 Drawing Sheet

(56) References Cited

OTHER PUBLICATIONS

Ju Han Lee; "Experimental Investigation of Continuous-Wave Supercontinuum Ring Laser Composed of Clad-pumped Er/Yb Codoped Fiber and Highly-nonlinear Optical Fiber"; Optics Communications, North-Holland Publishing Co. Amsterdam, NL, vol. 266; No. 2; Oct. 15, 2006; pp. 681-685, XP025252068; ISSN: 0030-4018.

* cited by examiner

SYSTEM FOR EMITTING A POLYCHROMATIC LIGHT, PROVIDED WITH COUPLED SUB-CAVITIES

TECHNICAL FIELD

The present invention relates to the generation of a continuous spectrum polychromatic light. It more particularly relates to a system for emitting a polychromatic light, comprising a laser cavity, means for optically pumping this laser cavity capable of emitting radiation according to at least an excitation wavelength, as well as light guiding means arranged in such a way as to supply a polychromatic light to an outlet in the event of excitation by this radiation in a non-linear interaction mode.

PRIOR ART

Such a system is known in patent document FR 2867574, which itself describes a device for generating a polychromatic light, comprising optical pumping means able to supply radiation of at least two different excitation wavelengths as well as light guiding means arranged in such a way as to supply a polychromatic light to an outlet in the event of excitation by the radiation in a non-linear excitation mode. In this regard, the guiding means comprise a non linear medium which makes it possible to set-up several frequency conversions. The optical pumping means comprise a laser cavity. The guiding means thus allow for an important extension of the light spectrum oscillating in the laser cavity.

As for the patent document FR 2884623 it describes a device for generating a polychromatic light, comprising optical pumping means, light guiding means and selective injection means. The pumping means are able to supply a first radiation of a first wavelength. The selective injection means make it possible to inject the first radiation from the pumping means in the guiding means, the latter being arranged to generate a harmonic corresponding to the selective injection and to supply a polychromatic light to an outlet by non-linear excitation from this first radiation and from this harmonic. The guiding means comprise for example a microstructured optical fiber and are substantially of mono-modal type for the first radiation and substantially of multi-modal type for the harmonic.

These devices of the prior art thus constitute continuum sources based on an extracavity pumping of a non-linear fiber. However, they do not allow for reaching a broad spectrum laser emission exhibiting a sufficient temporal and spectral stability (or jitter), which makes the produced radiation unusable for a number of applications.

SUMMARY OF THE INVENTION

Accordingly, the aim of the present invention is to achieve a broadband light with low temporal and spectral jitter, while having satisfactory simplicity, stability and encumbrance characteristics.

In this regard, the present invention is of the type described above and exhibits the feature of having its guiding means arranged within a cavity formed of at least two sub-cavities, amongst which a first sub-cavity forms the laser cavity and a second sub-cavity comprises the guiding means, these first and second sub-cavities being coupled together.

This solution makes it possible to dissociate and to cascade, on the one hand, the formation of a monochromatic or quasi monochromatic laser light, from the pumped laser cavity and, on the other hand, the spreading of its spectrum thanks to the use of the non-linear member constituted by the light guiding means. The problems of temporal jitter are resolved by introducing an active optoelectronic system for jitter-free triggering in this same cavity. The light thus generated may also be high energy light by arranging at least a gain medium in cascade. Furthermore, with the laser cavity forming a first sub-cavity coupled to a second sub-cavity comprising the non-linear member, the result is an assembly that is integrated within a unique resonator, promoting a compact and simple device.

The approach having led to this solution consisted in partially dissociating the formation of the monochromatic pulse and the spectral widening. The purpose was to prevent the non-linear members at the root of the spectral spreading from disrupting the formation of the monochromatic source pulse. In order to achieve this, the formation of a monochromatic pump pulse in a first short sub-cavity was partially isolated and the spectral extension in another sub-cavity was confined. These two cavities are then partially coupled by means of a joint mirror. The first sub-cavity is subcentimetric in order to generate a short monochromatic pulse. The second cavity triggers the first and has a great length in order to have the ability to initiate a laser effect within the first short cavity.

Preferably, the guiding means comprise a light guide. In this case, the light guide may be provided such that it is integrated on an optical substrate.

Preferably, these guiding means comprise an optical fiber of selected dimensions. In this case, the optical fiber may be provided such that it is microstructured.

Advantageously, the two sub-cavities each comprise at their ends a partial light reflecting means. In this regard, a particularly advantageous alternative would be to use Bragg mirrors as partial light reflecting means.

According to a specific embodiment, the coupling of two sub-cavities is achieved by arranging a common partial reflecting means to said two sub-cavities.

Preferably, the first sub-cavity comprises a gain medium in order to amplify the light emitted by the means for pumping this sub-cavity, without however reaching the laser emission threshold of the cavity.

According to a specific embodiment aiming to generate broadband light pulses, the first sub-cavity is provided such that it comprises means for generating a short pulse.

In this latter case, the means for generating a short pulse advantageously comprise a saturable absorber. This type of member is in fact particularly adapted to allow for the accumulation of light energy in the laser cavity during a determined duration, to then instantaneously free that which leads to a short duration pulse.

In order to achieve the triggering of the short pulse, the second sub-cavity may comprise external triggering means thereof arranged such that the triggering of this second sub-cavity leads to the release of the short pulse generated by the first sub-cavity.

According to a particular implementation of the second sub-cavity, the external triggering means comprise an optoacoustic modulator.

Preferably, the optical pumping means are arranged such as to supply radiation of a power substantially close to the laser emitting threshold of the first sub-cavity without reaching it. The temporal jitter is in fact even weaker the farther the power is from the emitting threshold and it is possible to pass way above this threshold with the action of the second active sub-cavity.

In order to trigger in a synchronized manner the release of a short pulse, the external triggering means are synchronized.

BRIEF DESCRIPTION OF THE DRAWINGS

The invention will be better understood upon reading the detailed description of a non limitative embodiment, accompanied with figures respectively representing.

DETAILED DESCRIPTION OF PARTICULAR EMBODIMENTS

By polychromatic light in the current patent is meant a light whereof the spectrum is substantially continuous and non-discretised in wavelength on a broadband.

Figure 1:
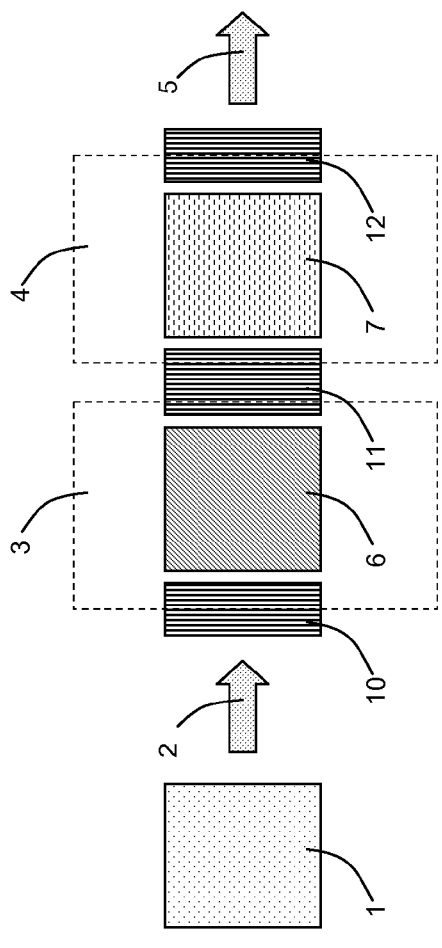
FIG. 1, a diagram representing a laser system according to a first embodiment of the invention, and FIG. 2, a diagram representing a laser system according to a second embodiment of the invention.

With reference to FIG. 1, a broadband light emitting system according to a first embodiment of the invention comprises optical pumping means 1, as well as a cavity formed of two coupled sub-cavities 3 and 4. More than two sub-cavities may be arranged in this cavity without departing from the scope of the present patent.

The coupling between cavities is an interferometric coupling in the sense that, and in what clearly appears upon reading the following description, the coupling operates on the same wavelength and may give rise to losses pertaining to phase superposition, or not, of the different components of laser radiation. Thus, a change in a cavity requires a change in the other activities.

The optical pumping means 1 make it possible to achieve the population inversion of the amplificatory medium 6 located in the first cavity 3.

These pumping means may for example be in the form of a quasi monochromatic laser diode or a flash lamp.

According to this first embodiment of the invention, the optical pumping means 1 may operate either according to a temporarily synchronized impulsional mode, or according to a quasi continuous or continuous mode.

The first sub-cavity 3 comprises a gain medium 6 which may take the form of a microchip, for example a YAG 1.1% type microcrystal laser. This first sub-cavity 3 also comprises two Bragg or dielectric mirrors 10 and 11, arranged at each end of the sub-cavity 3. This sub-cavity 3 thus forms a laser cavity that may be excited under the radiation effect 2 provided by the optical pumping means 1.

The second sub-cavity 4 comprises a non-linear member 7 surrounded by two Bragg or dielectric mirrors and 12. This member 7 forms light guiding means resulting from the first sub-cavity 3. It makes it possible to spread the light spectrum from the laser cavity 3 in order to supply a polychromatic light corresponding to a continuum at the output. This cavity is substantially longer (>×10) than the first cavity 3.

These guiding means 7 may comprise a light guide, constituted of fibers or crystals, possibly comprising an integrated circuit. The light guide may be an optical fiber, for example a dual core concentric fiber of a length of a few meters, considering that the skilled person will know how to choose the shape and dimensions of this fiber according to the considered application, particularly from the aspect of wavelengths of the light to emit. In fact, the skilled person will note the importance of the choice of the fiber (unimodal, multimodal, etc.) regarding its excitation modes.

In the case of an optical fiber, it may be microstructured, thus having the advantage of constituting an opto-geometrical structure, which can be modified during its production, which makes it possible to monitor the dispersion profile and allows a light guiding over the entire transmission band of the fiber material.

These guiding means 7 are arranged on the path of the laser cavity 3 in the longitudinal direction of this cavity. In these conditions, the light from the sub-cavity 3 is injected in the guiding means 7. Hence, it is possible to obtain a polychromatic light 5, in the event of excitation of these guiding means by the radiation from the cavity 3.

In order to optimally inject light from the laser cavity 3 in the light guide (or any other light guiding means able to allow for the apparition of non-linear interactions), it may be provided to introduce a converging lens upstream from said guide, as well as a particular orientation of the beam injected in said guide.

A light amplification member may also be provided in the second sub-cavity 4, in order to generate a higher energy broadband light.

The coupling of the two sub-cavities 3 and 4 works by the common arrangement of the mirror 11, the latter being at an end of the first sub-cavity 3 and at the other end of the second sub-cavity 4. The Bragg or dielectric mirrors 10 and 12—to the two other ends of the two sub-cavities 3 and 4—thus constituting the two mirrors surrounding the main cavity. Thus, it is to be noted than the sub-cavities form, by virtue of their coupling, a third cavity: the main cavity.

For a pump diode 1 exhibiting a maximum emission at a wavelength of 808 nanometers and a mean power of 3 watts, a mirror 10 may for example be used, of which the maximum reflection is located at 1064 nanometers and the minimum at 808 nanometers, a mirror 11 of reflection coefficient 87% at 1064 nm and a mirror 12 of reflection coefficient 95% at 1064 nm.

Thus, one achieves a broadband light emission system, based on a monochromatic or quasi monochromatic laser light initially formed within the laser cavity 3, by widening of the spectrum of this laser light. This polychromatic light, by cascading and coupling the two sub-cavities, exhibits a good temporal stability with short pulses (sub-nanoseconds).

As a unique resonator formed by two coupled sub-cavities, the broadband light emission system is relatively compact.

Regarding the power of the optical pumping means, the skilled person will note that the conversion efficiency of the excitation photons towards the continuum photons depends on the crest power supplied by the first cavity 3 and on the mean power of the optical pumping module 1, and the dimensions of the core as well as the fiber length 7—Thus, an optical pumping module supplying a strong light power (all types of excitation wavelengths) makes it possible to use an optical fiber (or more generally a light guide).

Regarding the spectral widening corresponding to the generation of the broad spectrum polychromatic light, it can be considered to achieve it in one single passage in the fiber 7, or in several passages.

Regarding the choice of the excitation wavelength(s), these may be determined such that a homogenous and symmetrical spectral widening appears on either side of one of the pump wavelengths as well as a minimization of Raman components.

Figure 2:
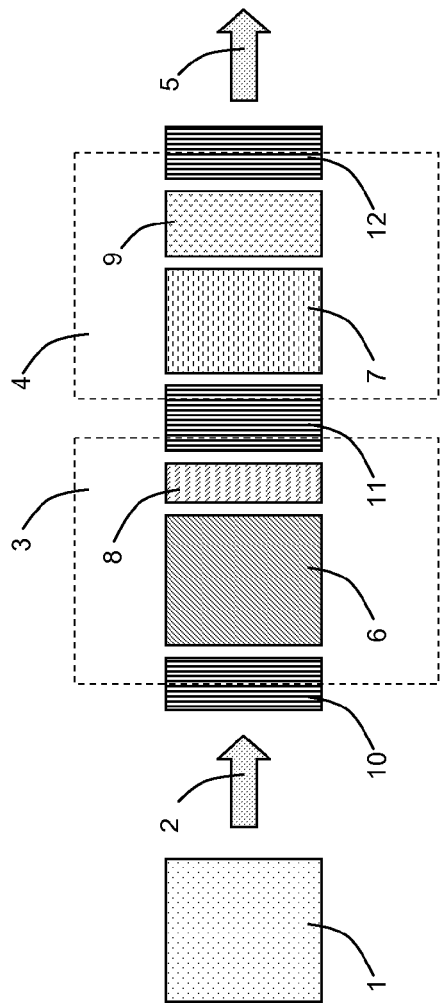

Now a second embodiment of the invention is described, making it possible to generate short pulses of broad spectrum and low temporal and spectral jitter, with reference to FIG. 2.

In this alternative, the first sub-cavity 3 also comprises a passive saturable absorber 8, formed for example of an (absorber) CR4+ abs 3 cm$^{-1}$. It may be provided that the members 6 and 8 be comprised in one and single component.

The second sub-cavity 4 comprises an external trigger 9, which may for example be a modulator (opto-acoustic, opto-electronic or micro-opto-electro-mechanical), another laser, for example a short pulse microlaser, or a picosecond laser diode.

The optical pumping means 1 of the first sub-cavity 3 are arranged with respect to this sub-cavity such as not to reach its laser emission threshold, while being substantially close thereto.

By the coupling between the two sub-cavities, the saturable absorber 8 of the first sub-cavity 3 makes it possible to prevent the starting of the laser by introducing optical losses and thus resulting in a storage of light energy within the crystal amplifier 6. The external triggering operated by the trigger 9 of the second sub-cavity 4 makes it possible to trigger, in cascade, the cavity 3 thus producing a monochromatic pulse.

Thus, the generation of a short length, high energy light pulse is obtained, controlled by an external trigger to the pumped sub-cavity 3. The operating frequency of the trigger 9 thus, determines the emission frequency of the light pulses from the system. The duration of the engendered optical pulse is determined by the length of the cavity 3 and by the type of saturable absorber positioned inside.

This monochromatic pulse crosses the coupling mirror and brings about a broad spectrum by means of the non-linear medium 7.

Thus, one achieves an intra-cavity continuum in stable "Q-SWITCH" mode. This broadband spectrum is generated in the amplifier cavity (i.e., the sub-cavity 4), thus, in a cavity outside sub-cavity 3 but within the cavity formed by the mirrors 10 and 12.

The aforementioned embodiments described in the present invention are given by way of examples and are in no way limited. It is obvious that the skilled person is likely to achieve various alternatives of the invention within the framework of the patent.

In particular, it may be considered to arrange several light emission systems, objects of the invention, either in cascade or in parallel, or both, according to considered applications and the required performance.

In addition, this system may be adapted according to the considered application, particularly for applications in the telecommunications and biphotonic fields particularly for the diagnosis or cell sorting, of ophthalmology, optical coherent tomography or cofocal microscopy.

The invention claimed is:

1. A system for emitting a polychromatic light, comprising a laser cavity, means for optically pumping the laser cavity capable of emitting radiation based on at least one excitation wavelength, and light guiding means arranged in such a way as to supply a polychromatic light to an outlet in the event of excitation by said radiation in a non-linear interaction mode, the guiding means are arranged inside a cavity formed by at least two sub-cavities, a first sub-cavity of which forms said laser cavity and a second sub-cavity comprises said guiding means, and said first and second sub-cavities being interferometrically coupled, wherein the guiding means comprise at least an optical fiber of selected dimensions, wherein the optical fiber is microstructured and/or doped and/or has a decreasing transverse dimension based on a propagation, wherein the first sub-cavity comprises short pulse generating means and the second sub-cavity comprises external triggering means thereof arranged such that a triggering of said second sub-cavity causes a release of a short pulse generated by said first sub-cavity, wherein the optical pumping means are arranged such as to supply radiation of which power does not reach a laser emission threshold of the first sub-cavity while being substantially close thereto and wherein the second sub-cavity is substantially longer than the first sub-cavity.

2. The emission system according to claim 1, wherein the guiding means is made on a planar optical substrate.

3. The emission system according to claim 1, wherein the two sub-cavities each comprise partial light reflection means at the ends thereof.

4. The emission system according to claim 3, wherein the partial light reflecting means are Bragg mirrors.

5. The emission system according to claim 4, wherein the coupling of the two sub-cavities is made by arranging a partial reflecting means common to said two sub-cavities.

6. The emission system according to claim 1, wherein the short pulse generating means comprise a saturable absorber.

7. The emission system according to Claim 1, wherein the external triggering means comprise an optoacoustic modulator.

8. The emission system according to claim 7, wherein the external triggering means are synchronized.

* * * * *